Patented June 18, 1940

2,204,749

UNITED STATES PATENT OFFICE 2,204,749

ANTHRAQUINONE DYESTUFFS

Samuel Coffey, Norman Hulton Haddock, and Clifford Wood, Blackley, Manchester, England, assignors to Imperial Chemical Industries Limited, a corporation of Great Britain No Drawing. Application January 27, 1938, Serial No. 187,318. In Great Britain February 1, 1937

4 Claims. (Cl. 260—373)

This invention relates to new dyestuffs and intermediates for the manufacture of dyestuffs and more particularly to new sulfonic acids of anthraquinone derivatives.

This invention has as an object to provide new dyestuffs. A further object is to provide new intermediates for the manufacture of dyestuffs. A further object is to devise a new method of manufacturing such dyestuffs and intermediates. Further objects will appear hereinafter.

These objects are accomplished by the following invention.

We have found that if we react a leuco derivative of an anthraquinone compound of the general formula

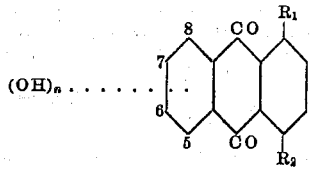

(in which $R_1$ stands for an amino or a hydroxyl group,
$R_2$ stands for $R_1$ or an alkylamino, cycloalkylamino, or arylamino group,
$n$ stands for 0, 1, or 2, and
The dotted line signifies that the hydroxyl groups, if present, may be attached to any of the positions marked 5, 6, 7 and 8), with either an amine of the formula

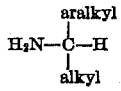

or of the formula

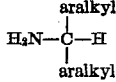

and oxidise the resulting leuco derivative and then sulfonate, we get new sulfonic acids of anthraquinone derivatives which may be used either as coloring matters for animal fibers or as intermediates for the manufacture of dyestuffs.

The new compounds have the general formula

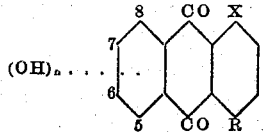

(where X stands for either an

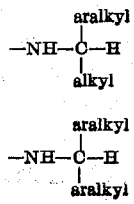

or an

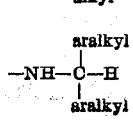

group, and R stands for X or a hydroxyl, amino, alkylamino, cycloalkylamino, or arylamino group; and $(OH)_n$ . . . . has the same significance as before).

Interaction of the starting leuco derivatives and the amines may be effected by heating them together. An excess of the amines can be employed, as the excess provides a convenient medium for the interaction. An inert liquid diluent or solvent may also be employed as a medium. When the amine is interacted with a starting leuco derivative which contains two replaceable groups, as is the case with compounds such as leuco-quinizarin, leuco-1,4,5-trihydroxy-anthraquinone and leuco-1,4-diaminoanthra-quinone, then the interaction can be carried out until either one or both groups have been replaced. Further, when two groups are to be replaced, they can be replaced by means of two different formulated amines, by using two different amines successively, or simultaneously.

The oxidation of the interaction products, which as indicated above are themselves leuco derivatives of anthraquinone compounds, can be effected by means of air in the presence of alkali or by the use of other oxidising agents previously employed for oxidising leuco-quinizarin and leuco-1,4-diaminoanthraquinone derivatives. Sulfonation may be effected by treating with a sulfonating acid, especially sulfuric acid. One or more sulfonic acids can be readily introduced according to the conditions employed in the sulfonation.

The following examples, in which parts are by weight, illustrate but do not limit, the invention.

Example 1

4.8 parts of leuco-quinizarin, 20 parts of pyridine, and 12.6 parts of $\alpha,\gamma$-diphenyl-$\beta$-amino-propane (made by reacting dibenzyl ketone with ammonium formate or formamide, and then hydrolysing the resulting formyldiphenyl-isopropylamine) are boiled under a reflux condenser, in a coal-gas atmosphere, for 18 hours. Air is then passed through the reaction mixture until the solution turns blue, the mixture is then diluted with ethyl alcohol, the resulting precipitate is filtered off, washed with ethyl alcohol and crystallised from the monoethyl ether of ethylene glycol. The new compound is a dark blue crystalline substance, M. P. 142° C., which dissolves in benzene with a bright blue colour.

6 parts of the so-obtained compound are dissolved in 70 parts of 98% sulphuric acid at 20–25° C. The solution is stirred for 1 hour, and poured on to a mixture of ice and water. The precipitated dyestuff is filtered, dissolved in hot dilute sodium hydroxide solution and reprecipitated by adding sodium chloride, and dried. The dry dyestuff, which is 1,4-bis-(dibenzylmethylamino)-anthraquinonesulphonic acid, has the probable formula

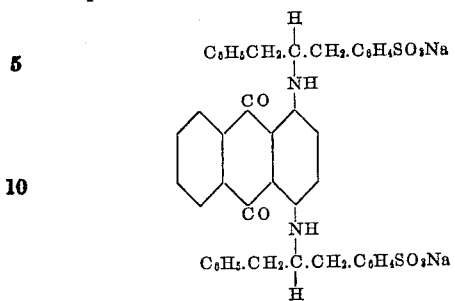

and is a dark-blue powder, which dissolves in water with a bright blue color. The dyestuff dyes wool from an acid bath in bright blue shades of very good fastness to washing, milling and light.

By replacing the αγ-diphenyl-β-aminopropane by a corresponding quantity of α-phenyl-β-aminobutane, another but similar dyestuff is obtained.

Example 2

4.8 parts of leuco-quinizarin and 20 parts of α,ε-diphenyl-γ-aminopentane

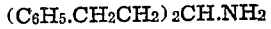

(made by reacting dibenzylacetone with ammonium formate or formamide, and hydrolysing the resulting formyl compound), are heated together for 18 hours at 130–135° C. 300 parts of ethyl alcohol, and 30 parts of 30% caustic soda solution are added and air is passed through the mixture at about 90° C. until the oxidation of the leuco interaction product is complete. The blue mixture is cooled, filtered, washed with ethyl alcohol and dried. If desired the product may be crystallised from butyl alcohol, from this it is obtained in long dark needle crystals, M. P. 97–98° C. which dissolve in benzene with a bright blue color.

The sulphonation is carried out as described in Example 1 except that 96% sulphuric acid is used. The new dyestuff, 1,4-bis-(ββ'-dibenzylisopropyl-amino)-anthraquinone sulphonic acid, is soluble in water, and dyes wool in shades similar to those of the dyestuff of Example 1, but which have even better fastness to severe washing and light.

Example 3

4.8 parts of leuco-quinizarin, 20 parts of pyridine and 6.8 parts of α-phenyl-β-aminopropane (made by reacting benzylmethyl ketone with ammonium formate or formamide and then hydrolysing the resulting formylbenzylmethylamine) are boiled together for 16 hours. The resulting mixture is worked up as in Example 2. After crystallising from butyl alcohol the product is in the form of dark crystals of M. P. 123–124° C. which are soluble in benzene with a blue color. The recrystallised material is sulphonated by the process described in Example 1 and then yields a dyestuff which is similar in color and properties to that of Example 2. The dyestuff is 1,4 - bis - (β - phenylisopropylamino)-anthraquinonesulphonic acid.

Instead of α-phenyl-β-aminopropane, the corresponding quantity of α-phenyl-γ-aminobutane may be used to give a similar dyestuff.

Example 4

5 parts of leuco - 1,4,5 - trihydroxyanthraquinone, 11 parts of αγ-diphenyl-β-aminopropane and 20 parts of cresylic acid are heated together at 100° C. for 48 hours. The resulting mixture is worked up as described in Example 2 and recrystallised from butyl alcohol. The recrystallised product melts at 142–143° C. Sulphonation is done as in Example 1, except that 98.5% sulphuric acid is used and a temperature of 25–30° C. The resulting 1,4-bis-(β,β'-dibenzylisopropylamino)- 5 -hydroxyanthraquinonesulphonic acid, gives a greenish-blue color in water and dyes wool in bright greenish-blue shades which are greener than those of the dyestuff of Example 1, but have similar fastness to washing and milling.

A similar dyestuff is obtained by using the corresponding quantity of α,ε-diphenyl-γ-aminopentane instead of α,γ-diphenyl-β-aminopropane.

Example 5

13.2 parts of 1-p-toluidino-4-hydroxyanthraquinone, 12 parts of αγ - diphenyl - β - aminopropane, 40 parts of cresylic acid, and 9 parts of zinc dust are heated and vigorously stirred together at 100° C. for 24 hours. The resulting mixture is poured into 300 parts of boiling ethyl alcohol containing 50 parts of 30% caustic soda solution and a stream of air is passed through until oxidation is complete. The resulting mixture is filtered and the filter cake recrystallised from boiling butyl alcohol (the solution being filtered whilst hot to remove zinc dust). The recrystallised product is a dark blue powder, of M. P. 130° C. which dissolves in benzene with a greenish-blue color. It is sulphonated in 100% sulphuric acid at 25–30° C. and the sulphonation mixture worked up as in Example 1. The resulting dyestuff, 1,β,β'-diphenylisopropylamino - 4-p-toluidinoanthraquinonesulphonic acid, dissolves in water with a greenish-blue color and dyes wool in greenish-blue shades of excellent fastness to severe washing, milling and light.

Instead of 1-hydroxy-4-p-toluidinoanthraquinone the corresponding quantity of 1-hydroxy-4-p-n-butylanilinoanthraquinone can be used, and a similar dyestuff obtained.

Example 6

4.8 parts of leuco-quinizarin, 5.3 parts of αε-diphenyl-γ-aminopentane, and 10 parts of cresylic acid are heated and stirred together at 100° C. for 24 hours. 300 parts of ethyl alcohol and 40 parts of 30% caustic soda, are added to the resulting mixture and a stream of air is passed through it until oxidation of the leuco 1,β,β'-dibenzylisopropylamino-4-hydroxyanthraquinone is complete. During this operation, the temperature is kept at about 60–70° C. After cooling to 30° C. the mixture is acidified with hydrochloric acid, the precipitate filtered off and recrystallised from butyl alcohol. The recrystallised material is in dark violet crystals, of M. P. 95–96° C., which dissolve in pyridine with a bright violet color. The sulphonation is carried out in 98% sulphuric acid at 30° C. and the resulting sulphonation mixture worked up as in Example 1. The resulting dyestuff, 1-β,β'-dibenzylisopropylamino - 4-hydroxyanthraquinonesulphonic acid, dissolves in water with a red-violet color and dyes wool in very bright red-violet shades of good fastness to light.

Example 7

4.8 parts of leuco - 1,4 - diaminoanthraquinone and 20 parts of α,γ-diphenyl-β-aminopropane are heated together at 115–120° C. for 16 hours. During this time, ammonia is slowly evolved. The resulting mixture is cooled and the product worked and sulphonated as in Example 1. The dyestuff is the same as that of Example 1.

Some of the most suitable leuco derivatives of anthraquinone compounds to use as starting materials are the following:—leucoquinizarin (i. e. leuco-1,4-dihydroxyanthraquinone), leuco-1,4,5-tri- and 1,4,5,6- and 1,4,5,8-tetra-hydroxyanthraquinones, leuco-1-anilino- 4- hydroxyanthraquinone, leuco-1,4-diaminoanthraquinone and leuco-1-methylamino-4 - anilinoanthraquinone. Some of the most suitable amines to use are the following: α-phenyl-β-aminopropane, α-phenyl-β-aminobutane, α,γ-diphenyl-β-aminopropane, α-phenyl-γ-aminobutane and α,ε - diphenyl - γ - aminopentane.

In some cases the operation of interacting the amine with the leuco starting material may be combined with that of preparing the leuco starting material. Thus the preparation, by reduction, of the necessary starting leuco derivative, and the interaction of the starting leuco derivative with one of the formulated amines may be effected as part of a single operation, without isolation of the starting leuco derivative. Similarly the preparation of a starting material such as leuco-1-anilino-4-hydroxyanthraquinone and its interaction with one of the formulated amines may be effected by, for example, interacting leuco-quinizarine with aniline in a suitable medium until leuco-1-anilino-4-hydroxyanthraquinone is obtained and then adding to the reaction mixture one of the formulated amines and continuing interaction.

The new dyestuffs as dyestuffs for animal fibres possess the merit of being readily soluble in water and of dyeing easily in level shades. These shades are bright and have good to excellent fastness to light, washing and milling. The dyestuffs may carry up to 4 phenyl radicals, and may be obtained with 1, 2 or more sulfo substituents. Dyestuffs with different numbers of sulfo substituents differ in dyeing and fastness properties, and by proper selection of sulfonation conditions, particular properties can be obtained. In general we find that the use of the formulated amines improves the fastness of the dyestuff obtained as compared with similar dyestuffs previously obtained using aliphatic amines, while still conferring the brightness of shade and good dyeing properties associated with the use of aliphatic amines.

As many apparent widely different embodiments of this invention may be made without departing from the spirit and scope thereof, it is to be understood that we do not limit ourselves to the specific embodiments thereof except as defined in the appended claims.

We claim:

1. Compounds of the class consisting of those having the following general formula and their sulfonation products:

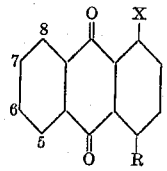

where X stands for a radical of the group consisting of:

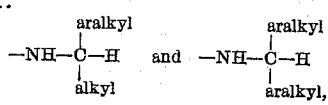

R stands for a substituent of the class consisting of hydroxyl, amino, alkylamino, cycloalkylamino, arylamino,

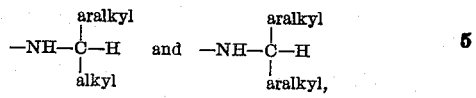

the positions 5, 6, 7 and 8 being occupied by a substituent of the class consisting of —H and —OH, but in no case are there more than two hydroxyl groups present in that ring of the anthraquinone nucleus.

2. Compounds having the general formula:

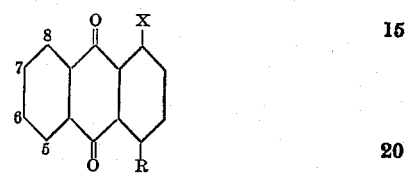

where X stands for a radical of the group consisting of:

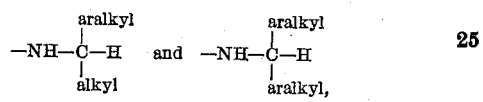

R stands for a substituent of the class consisting of hydroxyl, amino, alkylamino, cycloalkylamino, arylamino,

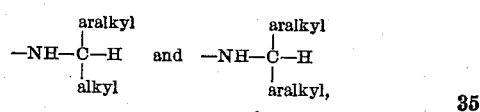

the positions 5, 6, 7 and 8 being occupied by a substituent of the class consisting of —H and —OH, but in no case are there more than two hydroxyl groups present in that ring of the anthraquinone nucleus.

3. The process which comprises reacting a leuco derivative of an amine compound of the general formula:

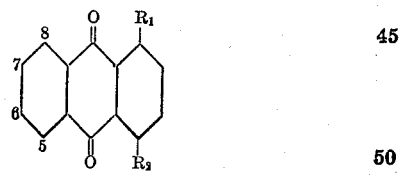

in which $R_1$ stands for a substituent of the class consisting of amino and hydroxyl groups, $R_2$ stands for a substituent of the class consisting of amino, hydroxyl, alkylamino, cycloalkylamino and arylamino groups, the positions 5, 6, 7 and 8 being occupied by a substituent of the class consisting of —H and —OH, but in no case are there more than two hydroxyl groups present in that ring of the anthraquinone nucleus, with an amine of the class consisting of those having the formula:

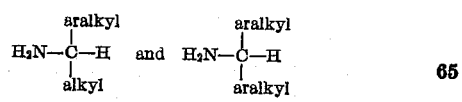

4. The process of claim 3 wherein the condensation product is further reacted with a sulfonating agent.

SAMUEL COFFEY.
NORMAN HULTON HADDOCK.
CLIFFORD WOOD.